Aug. 25, 1964     M. SCHWARTZ ETAL     3,145,616
SLIDE AND SOUND RECORD CARRIER
Original Filed July 9, 1954     2 Sheets-Sheet 1
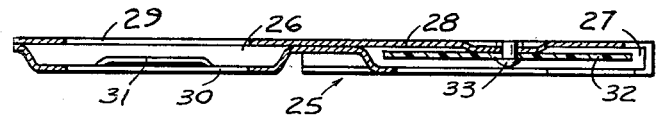
FIG. 3
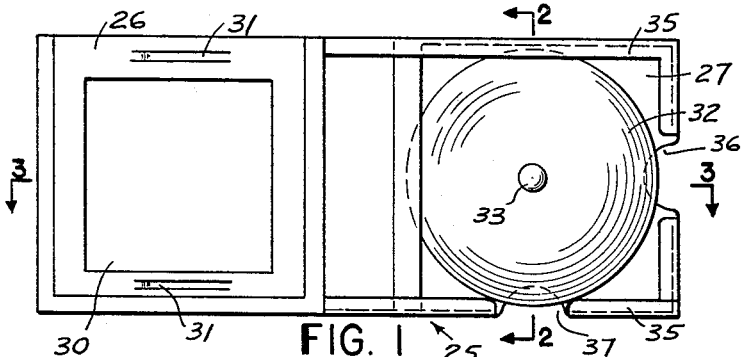
FIG. 1     FIG. 2
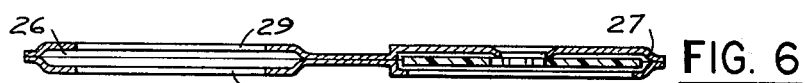
FIG. 6
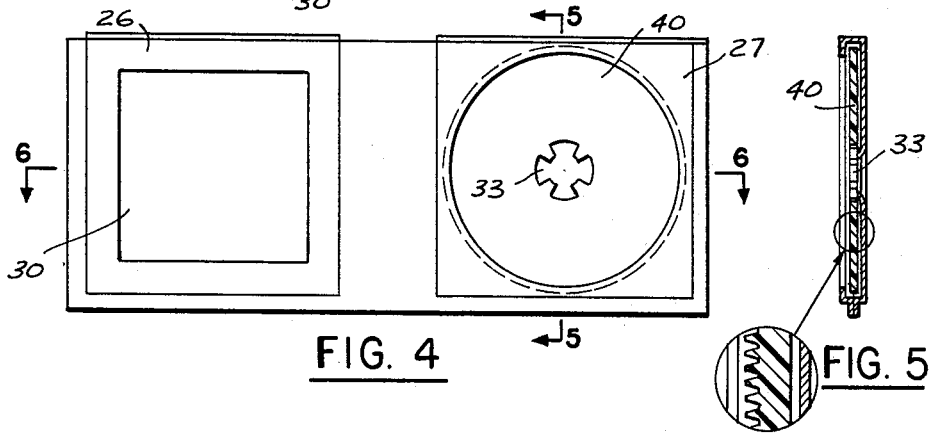
FIG. 4     FIG. 5
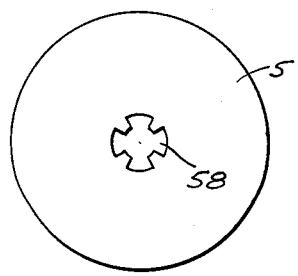 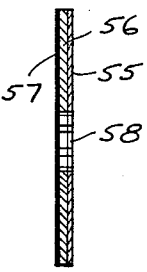
FIG. 7     FIG. 8
INVENTORS
MORRIS SCHWARTZ
EDWARD K. KAPRELIAN
BY
ATTORNEY Aug. 25, 1964

M. SCHWARTZ ETAL 3,145,616

SLIDE AND SOUND RECORD CARRIER

Original Filed July 9, 1954

INVENTORS
MORRIS SCHWARTZ
EDWARD K. KAPRELIAN
BY

ATTORNEY

United States Patent Office
3,145,616
Patented Aug. 25, 1964

3,145,616
SLIDE AND SOUND RECORD CARRIER
Morris Schwartz and Edward K. Kaprelian, Plainville, Conn., assignors to The Kalart Company, Inc., Plainville, Conn.
Original application July 9, 1954, Ser. No. 442,362, now Patent No. 2,961,922, dated Nov. 29, 1960. Divided and this application Sept. 14, 1960, Ser. No. 63,710
8 Claims. (Cl. 88—28)

The present invention relates to means for rendering the viewing of photographic transparencies or slides more informative and enjoyable. This application is a division of Ser. No. 442,362, filed July 9, 1954, which matured into Patent No. 2,961,922, November 29, 1960.

Photographic slides may be directly viewed through a viewer or projected by means of a projector. The invention is primarily concerned with the latter method of showing slides which is generally the more effective one.

While a projected slide image, as any picture, is to a certain extent self-explanatory, additional information or comment pertaining to the slide image is often necessary or at least desirable. This is not only true for slide images of technical, scientific or promotional nature but also for slides of more personal interest. The enjoyment of viewing slides will often be greatly enhanced by an accompanying comment on the situation or location depicted on the slide.

While movie film with sound track is well known, both for amateur and professional use, there are not available as far as the applicant is aware, any means for directly associating a slide or other still photograph with a recorded sound message.

Accordingly, one of the principal objects of the invention is to provide novel and improved means associating a slide and a sound track carrier for simultaneous projection and sound reproduction respectively.

A more specific object of the invention is to provide common holder means for holding a slide and a sound track carrier in position for simultaneous projection and sound reproduction respectively.

The term "slide" as used herein, is intended to encompass single picture slides and stereoscopic slides, both for black and white and for color projection.

Further objects, features and advantages of the invention will be pointed out hereinafter and set forth in the appended claims forming part of the application.

In the accompanying drawings several preferred embodiments of the invention are shown by way of illustration and not by way of limitation.

In the drawings:

FIG. 1 is a plan view of a holder for a slide and a record disc.

FIG. 2 is a section taken on line 2—2 of FIG. 1.

FIG. 3 is a section taken on line 3—3 of FIG. 1.

FIG. 4 is a plan view of a modification of the slide and record disc holder of FIG. 1.

FIG. 5 is a section taken on line 5—5 of FIG. 4.

FIG. 6 is a section taken on line 6—6 of FIG. 4.

FIG. 7 is a plan view of a sound track carrier insertable in a holder according to the invention.

FIG. 8 is a diametrical section of FIG. 7.

Figure 9:
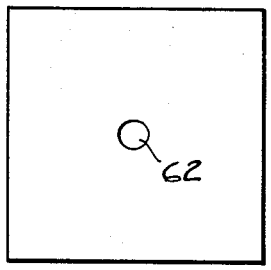
FIG. 9 is a plan view of a different kind of a sound track carrier insertable in a holder according to the invention.

The holders according to FIGS. 1 to 14 inclusive, have in common that each of the holders shown in the respective figures provides means for supporting a slide, either of the single picture type or the stereoscopic type, and a sound track carrier in a spatial relationship such that upon insertion of the holder in an appropriately designed device, the slide and the sound track are held in operational positions for simultaneously projecting the slide and reproducing the intelligence recorded by the sound track. As explained before, such an arrangement according to the invention causes in effect the slide to tell its own story when it is projected thereby giving the showing of slides a new impetus and making it more interesting and informative.

Referring first to FIGS. 1, 2 and 3 in detail, the holder according to these figures comprises a frame 25 made as shown of sheet metal or any other suitable material such as plastic. The frame has a slide or transparency receiving portion 26 and a sound track receiving portion 27. To form these portions, the frame may be dished and the resulting shallow pockets are closed with a back plate 28. The space in frame portion 26 is open at the long edges of the frame to permit the insertion of a slide into said space. Windows 29 and 30 serve to permit projection of a slide inserted in frame portion 26. The slide may be visualized as a conventional slide in which the film proper is mounted in an appropriate frame made for instance of cardboard. The slide is retained in the frame by the margin of the slide frame extending between the respective wall portions of frame 25. The slide may further be releasably retained in frame portion 26 by providing leafsprings 31.

The sound track which is received by frame portion 27 is shown as a record disc 32. This disc may be visualized as being made of or including magnetic sound recording material on which the desired intelligence is magnetically recorded. Appropriate discs will be more fully described hereinafter. The disc is rotatable about a pin 33 extending through the front of holder 27. The opposite back portion of disc holder 27 is provided with an appropriate depression 34 which acts as a bearing at the rear center of the disc to reduce friction between the disc and back plate 28. As can best be seen in FIG. 1, the disc partly underlies turned over flanges 35 of the frame. It may be centrally rotated or by means of a roller engaging the periphery of the disc. To permit such engagement, holder portion 27 is cut out at 36 and 37.

As appears from the previous description and the figures, the holder supports the slide and the disc in a side-by-side position and permits insertion of the holder with the slide and the disc in such position in one of the devices as shown in FIGS. 20 to 24 inclusive of Patent No. 2,961,922.

The holder according to FIGS. 4 and 5 is similar in principle to the previously described holder.

The holder again comprises a slide receiving portion 26 and a disc receiving portion 27.

The slide receiving portion 26 forms a pocket for insertion of a slide which may be projected through windows 29 and 30. The recording disc 40 is confined by edges of holder portion 27 but is otherwise free. It rotates about pin 33.

The disc may be a disc for magnetic sound recording as has been described in connection with FIGS. 1 to 3 but it may also be a disc in which the sound is recorded by cutting of grooves as indicated by the insert drawing associated with FIG. 5. Similarly a disc employing recording grooves may also be employed in connection with the holder according to FIGS. 1 to 3.

As is apparent, the holder according to FIGS. 4 to 6 retains the slide and the recording disc in a side-by-side position in the same manner as the holder of FIGS. 1 to 3.

FIGS. 7 and 8 show a recording disc as may be used with either of the holders according to FIGS. 1 to 4.

The disc according to FIGS. 7 and 8 comprises a non-magnetic metallic base 55, a resilient layer 56 which may be made of felt, paper, rubber, rubber composition or suitable plastic and a magnetizable layer 57 made for instance of suitable oxide sheeting. The three layers are cemented or otherwise bonded together, intermediate layer 56 forming a cushion for the sound carrying layer 57. A guide hole 58 which may be in form of a Maltese cross, serves to seat the record pin upon a drive shaft.

Figure 10:
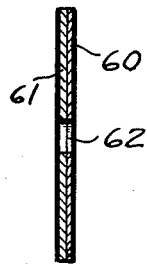
FIG. 10 is a section of FIG. 9.

FIGS. 9 and 10 show a square shaped recording plate which comprises a non-magnetic base 60 preferably made of aluminum or plastic to which is cemented or bonded a layer 61 made of suitable rubber or plastic impregnated with particles of magnetic material. A guide hole 62 serves to locate the plate in the holder.

Figure 11:
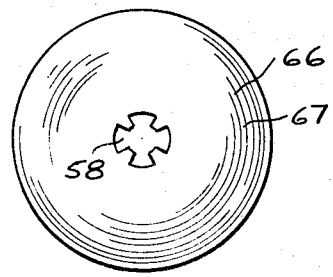
FIG. 11 is a plan view of still another sound track carrier insertable in a holder according to the invention.
Figure 12:
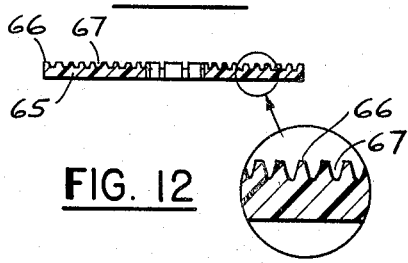
FIG. 12 is a diametric section of FIG. 11.

The recording disc according to FIGS. 11 and 12 comprises a suitable molded plastic base 65 carrying a recording oxide surface 66 in which are formed guide grooves 67. The disc is provided with a Maltese cross shaped drive opening 58.

Figure 13:
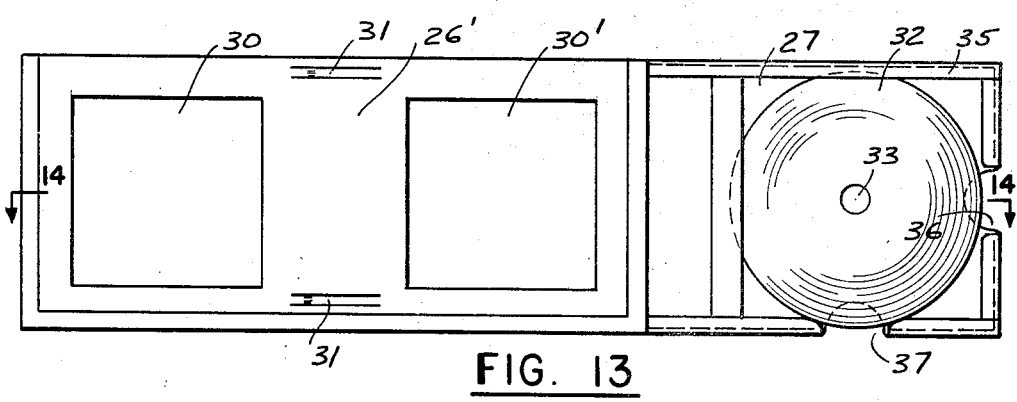
FIG. 13 is a plan view of a holder according to the invention designed for receiving a stereoscopic slide and a record disc.
Figure 14:
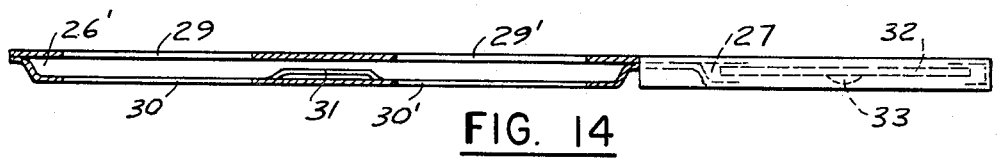
FIG. 14 is a section taken on line 14—14 of FIG. 13.

The holder according to FIGS. 13 and 14 is similar in principle to the holder according to FIGS. 1, 2 and 3, except that it is designed for a stereoscopic slide. Accordingly, the slide supporting frame portion 26' is broadened to accommodate two pairs of windows 29, 30 and 29' and 30' for the two pictures of a stereoscopic slide. The arrangement of the holder and its function are obvious from the description of the holder according to FIG. 1.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

We claim:

1. A holder for a photographic slide and a disk-shaped sound record carrier, said holder comprising a frame having side by side a slide-supporting portion and a sound-track carrier supporting portion disposed in co-planar, spatially fixed relationship for supporting the slide and the carrier independently of each other, said slide-supporting portion having a window therethrough and including guide tracks forming a pocket in the respective frame portion for receiving a slide and holding the same with reference to the window for projecting a slide inserted in said frame portion through the window, and said sound-track carrier-supporting frame portion including guiding and holding means engageable with a sound track carrier placed upon said carrier-supporting frame portion for guiding and retaining said carrier rotatably about its center axis on said frame portion.

2. A holder for a photographic slide and a disk-shaped sound record carrier, said holder comprising a frame having a slide-supporting portion and a sound-track-supporting portion disposed in co-planar relationship, said slide-supporting portion having a window therethrough and including guide tracks forming a pocket for receiving a slide and holding the same with reference to the window for projecting a slide inserted in said frame portion through the window, and said sound-record-carrier-supporting frame portion including holding means for supporting a disk-shaped sound record carrier, said holding means comprising a bearing pin for rotatably supporting the record disk and an abutment formed by a frame portion opposite said pin, said abutment constituting a countersupport for the disk upon the pin.

3. A holder according to claim 2, wherein said sound-record-carrier-supporting frame portion includes flanges overlying a record disk supported on said pin for retaining the disk on the pin.

4. A holder according to claim 3, wherein said frame portion for supporting the record disk is formed with recesses partially exposing the rim of the disk for driving the same by driving means engageable with the exposed rim part of the disk.

5. A holder according to claim 1, wherein said frame comprises a base plate having two recessed portions to form a pocket for receiving the slide and a pocket for receiving the sound record carrier, and a cover plate secured to said base plate and covering the recessed portions thereof, the base plate and the cover plate each including an aperture aligned with the pocket for receiving the slide, said apertures constituting said window for projecting the slide therethrough, and one of said plates including a second aperture aligned with the recess for receiving the sound record carrier to render the same accessible from the outside for the reproduction of sound from the carrier.

6. A holder according to claim 2, wherein said frame comprises a base plate having two recessed portions to form a pocket for receiving the slide and a pocket for receiving the sound record carrier, and a cover plate secured to said base plate and covering the recessed portions thereof, the base plate and the cover plate each including an aperture aligned with the pocket for receiving the slide, said apertures constituting said window for projecting the slide therethrough, and one of said plates including a second aperture aligned with the recess for receiving the sound record carrier to render the same accessible from the outside for the reproduction of sound from the carrier, said pin extending from the other of said plates into the recess for receiving the sound record carrier.

7. A holder according to claim 2, wherein said pin has a cross section in the form of a Maltese cross.

8. A holder according to claim 1 for a stereoscopic photographic slide, wherein said slide-supporting portion of the frame has two windows therethrough and includes guide tracks forming two pockets side by side and in spatially fixed relationship for receiving the two picture areas of the slide and locating the same with reference to said windows and projecting a stereoscopic slide inserted in said frame portion through said windows.

References Cited in the file of this patent

UNITED STATES PATENTS

| | | |
|---|---|---|
| 2,005,914 | Freund | June 25, 1935 |
| 2,287,624 | Langenfeld | June 23, 1942 |
| 2,683,390 | Steele | July 13, 1954 |
| 2,857,476 | Kleiber | Oct. 21, 1958 |
| 2,913,246 | Hagopian | Nov. 17, 1959 |